J. S. FRYE.
LEVELING AND ADJUSTING MEANS.
APPLICATION FILED MAY 24, 1915.

1,182,881.

Patented May 9, 1916.
2 SHEETS—SHEET 2.

WITNESSES:
Howard D. Orr.
H. T. Chapman

Jason S. Frye,
INVENTOR,
BY E. G. Siggers
Attorney

UNITED STATES PATENT OFFICE.

JASON SAMUEL FRYE, OF DOWNIEVILLE, CALIFORNIA.

LEVELING AND ADJUSTING MEANS.

1,182,881.  Specification of Letters Patent.  Patented May 9, 1916.

Application filed May 24, 1915.   Serial No. 30,114.

*To all whom it may concern:*

Be it known that I, JASON S. FRYE, a citizen of the United States, residing at Downieville, in the county of Sierra and State of California, have invented a new and useful Leveling and Adjusting Means, of which the following is a specification.

This invention has reference to leveling and adjusting means, and is designed to provide for the quick leveling and adjustment of out-of-level parts into a level condition.

The invention in some or many of its details has a wide range of applicability and is especially useful in connection with surveying instruments, such as transits, levels, compasses, plane-tables, etc., where frequent leveling or adjusting is necessary and where rapidity of accomplishment of such leveling or adjustment is of moment in the saving of time.

While the invention is by no means confined to any particular instrument or type of instrument, the description of the invention and its operation can be greatly facilitated by confining such description to the applicability of the invention to one instrument. For this reason the following description is confined to the invention as applied to a surveyor's transit, with the understanding, however, that the invention has a much wider range of applicability and usefulness.

A transit is customarily mounted upon a tripod which is set up usually with some near approach to a level, and the compass and telescope of the transit are brought into actual level by means of fine thread screws with milled heads.

Even when the instrument as first set up is quite nearly level, considerable adjustment of the fine screws is necessary, but when circumstances are such that the head of the tripod must be considerably out of level, then it often occurs that quite a wide range of movement of the leveling screws is necessary. If it be found that the screws run out before the level is reached, then the tripod must be reset and the adjustment remade at a considerable expenditure of time.

With the present invention such time consuming operations are avoided, and oftentimes the instrument may be brought into actual level without the necessity of touching the leveling screws, or with one or two turns, or even a fractional turn of one or more of the leveling screws. With the present invention the initial attainment of level is performed by a single quick movement, and if such movement demonstrates that the tripod is too much out of level the resetting and releveling is performed in a minimum of time.

It is the facility for extreme rapidity in bringing the parts into close approach to the desired level that constitutes a feature of the present invention.

The support for the instrument consisting of a tripod and tripod head, and the body of the instrument comprising a compass and transit telescope with appropriate levels may follow the usual lines in instruments of such character, while the structure of the invention is introduced between the tripod and the usual leveling screws.

The invention contemplates the employment of a plate or support having one face inclined to the plane of the plate, which latter may be considered as flat. Mounted on the inclined surface so as to turn thereon about an axis perpendicular to the plane of inclination of the inclined surface is a rotatable member; that is, it is capable of relative rotation with respect to the plate and may be rotated on the plate when the latter is held against rotation, although, of course, the same result is accomplished when the rotatable member is held still and the plate is rotated. The rotatable member, which may be conveniently of ring form, although not necessarily so, is provided with cam surfaces which may consist of parts or segments of an inclined plane so arranged as to conform more or less to the arc of rotation, although such conformity is more a matter of convenience than of necessity. The second-named cam surfaces, which for convenience of description may be considered as cam segments, are so spaced as to expose correspondingly located portions of the inclined surface of the plate, which latter for convenience of manufacture and adaptability, especially to a surveying instrument, may also be of ring shape.

When the invention is applied to a surveying instrument, two diametrically opposite leveling screws bear upon the exposed surface of the first-named plate or ring, while the other two leveling screws bear upon the two inclined or cam surfaces of the rotatable ring. Since two opposite screws bear upon the first-named inclined surface and the other two upon the second-named inclined surface, and the latter because of its rotation about a relatively inclined axis is on movement constantly changing its relation to the first surface, one screw bearing upon the second inclined surface is raised as the other is lowered, and vice versa, so that the head of the instrument carrying the compass and level is rocked about an axis represented by the points of contact of the other diametrically opposite leveling screws either with the corresponding inclined plane or upon cups or the like interposed between the leveling screws and the inclined plate supporting it. There is thus provided a quick-acting means progressing through its full range of movement by even less than a quarter turn to rock the portions of the surveying instrument to be leveled from an out-of-level position represented by the position of the tripod into an actually level position, or one so close thereto that a turn or two, or even a fractional turn of the leveling screws or some of them will effect the final accurate leveling of the instrument.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings but may be changed and modified so long as such changes and modifications mark no material departure from the salient features of the invention.

Figure 1:
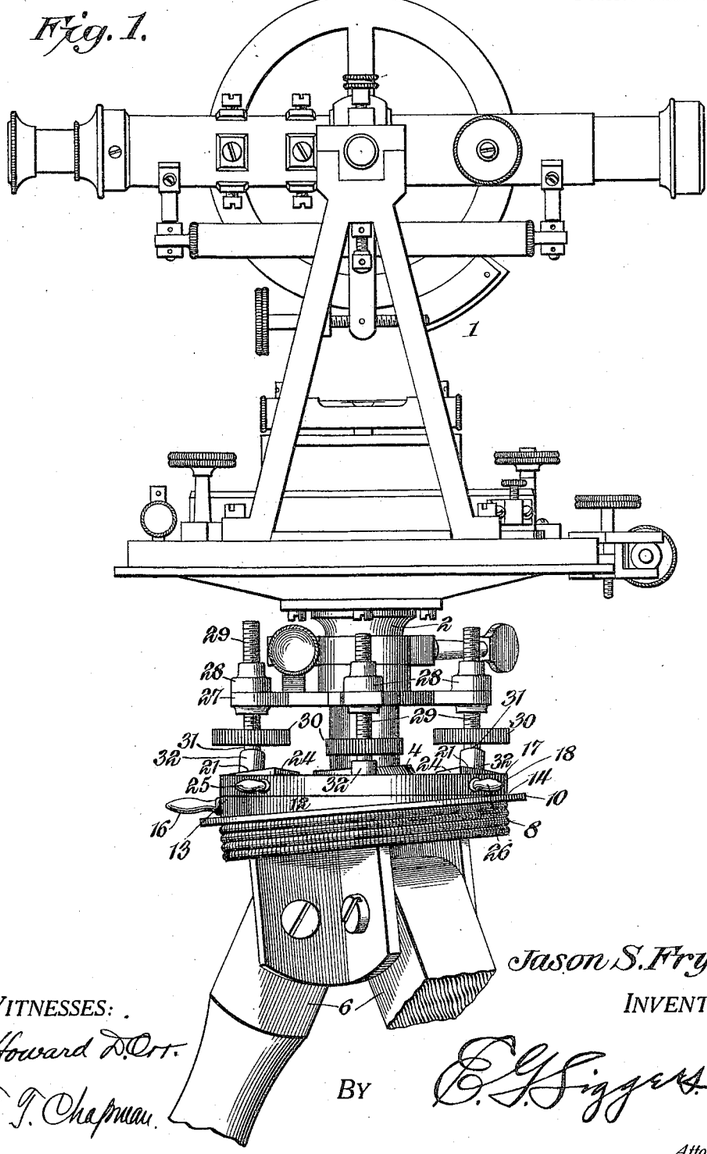
—Figure 1 is an elevation of a surveyor's transit with the invention applied and showing the head of the transit in the level condition with the tripod head in the out-of-level condition.
Figure 2:
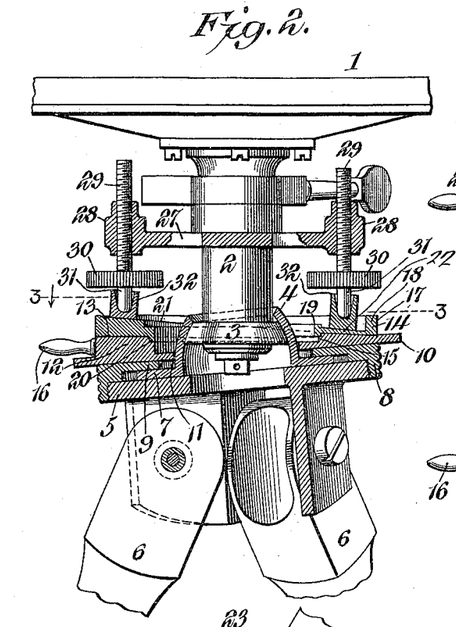
Fig. 2 is a view similar to Fig. 1 but showing parts comprising the present invention in diametric vertical section.
Figure 3:
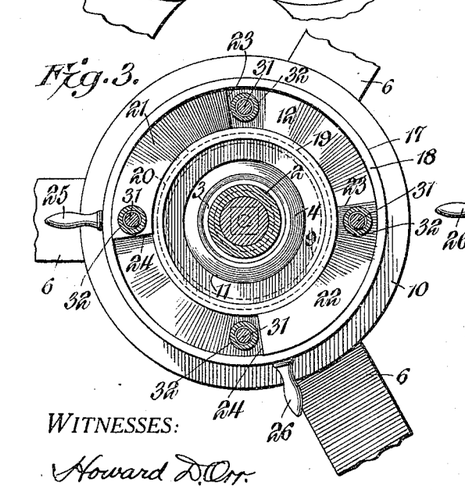
Fig. 3 is a section on the line 3—3 of Fig. 2, with the rotatable member differently positioned.

Referring to the drawings there is shown a transit head 1 mounted on the usual post 2 connected by a ball and socket joint 3; 4 to a head 5 constituting the head of a tripod, the legs of which are indicated at 6. The socket member 4 of the ball and socket joint is provided with the usual radial flange 7 held to the head 5, which is in the form of a flat plate, by a ring nut 8 having an inwardly directed radial flange 9 overriding the flange 7, which latter is sufficiently smaller than the nut 8 to permit lateral shifting of the socket 4 in various directions on the head 5.

The parts so far described are those customarily incorporated in a surveyor's transit, and need no specific description. The showing of the drawings is that of a known form of transit, and may be taken as indicative of any of the various forms of transit instruments on the market.

The socket member 4 of the ball and socket joint is in the form of a frusto-spherical shell in the particular showing of the drawings, and the nut 8 with its inwardly directed flange 9 has a flat upper surface, the expressions of position both here and elsewhere throughout the description having reference to the instrument when in use.

Applied to the upper surface of the nut 8 is a plate 10 having a central passage 11 therethrough of a size to fit quite snugly about the shell 4, but still be sufficiently free to be rotated about the shell on an axis coinciding with the polar axis of the shell.

The plate 10 is of greater diameter than the nut 8 so as to participate in the shifting of the shell 4 on the head 5 and still leave the margins of the plate projecting sufficiently with reference to the margins of the nut to provide for ready manipulation, since the plate 10 then constitutes a ready means whereby the entire surveying head of the instrument may be shifted laterally on the tripod as is sometimes of advantage in centering the instrument by means of a plumb bob over some particular point.

Figure 5:
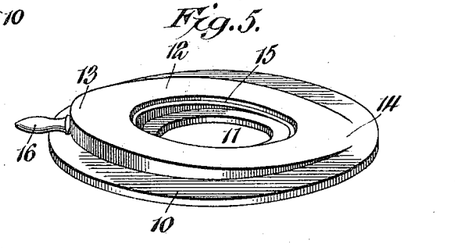
Fig. 5 is a perspective view of the plate having the inclined surface and supporting the structure of Fig. 4.

That surface of the plate 10 in engagement with the nut 8 is flat or plane in conformity with the corresponding face of the nut and its flange 9, so that the two engage over a somewhat extended area. The other or upper side of the plate 10 has a portion 12 surrounding and outwardly spaced from the opening 11 and concentric with and inwardly spaced from the outer margin of the plate 10. The portion 12 is inclined with relation to the plane of the plate 10, the inclination being from a high point 13 at one side of the inclined part 12 to a low portion 14 at the diametrically opposite side thereof, where it may come close to or even merge into the upper surface of the plate 10.

Since the plate 10 is designed to rotate about a central axis corresponding to the polar axis of the shell 4, the plate may be conveniently made circular and because of the central opening 11 is in the form of a ring with the thickened portion or inclined ledge 12 also of ring shape.

Figure 4:
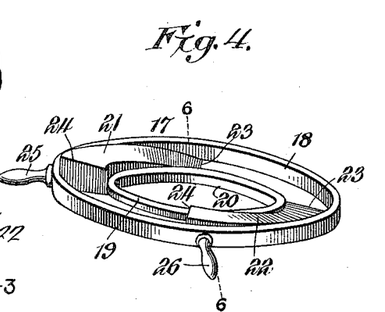
Fig. 4 is a perspective view of the rotatable member.

About the inner edge of the ring-shaped inclined ledge 12 is a circular rabbet 15 for a purpose which will presently appear, the rabbet being inclined in conformity with the inclination of the ledge 12. At the thick portion of the ledge 12 there is a radially outstanding handle 16 provided for the convenient turning of the plate or ring 10, but it will be understood that this handle may be otherwise located and otherwise arranged, or omitted. There is also provided a ring-shaped member 17 formed of two concentric rings 18, 19, the latter being the smaller of the two. These two rings are so located as to engage the ledge 12 adjacent to its outer and inner margins, respectively, while the ring 19 is formed with a circular rib 20 adapted to the rabbet 15, whereby the ring 17 may rest upon the ledge 12 and turn thereon concentrically therewith, being guided in its turning movements by the seating of the rib 20 in the rabbet 15.

Figure 6:
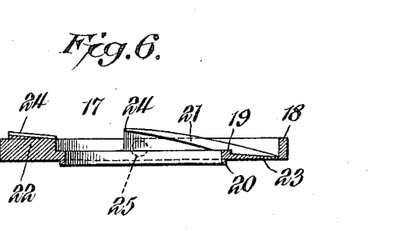
Fig. 6 is a section on the line 6—6 of Fig. 4.

The two ring portions 18 and 19 of the ring 17 are joined by segments 21, 22 of one inclined plane, and the ring 17 made up of the rings 18 and 19 and the segments 21 and 22 may be formed in one piece. For purposes of strength of construction the inclined plane segments 21 and 22 may have their lower surfaces both in one plane conforming to the plane of the bottom of the ring 17, while the upper surfaces of these two segments rise from one end 23 of each segment to the other end 24 thereof. The extent of rise of the segments 21 and 22 from their thinner to their thicker ends may be as great as or even greater than the extent of rise of the inclined ledge 12.

Considering the ring 17 as circular, or circumferentially continuous throughout, the inclined segments 21 and 22 may embrace an arc of about ninety degrees each, while the like ends of these segments are spaced apart by a distance representing an arc of about ninety degrees.

The end 23 of each segment 21 and 22 is brought to a relatively thin edge, or with its upper surface into close approach to the surface of the ledge 12 and considered radially the edge 23 is thicker adjacent to the ring 19 than adjacent to the ring 18. The opposite condition is present with respect to the ends 24; that is, they are thicker adjacent to the ring 18 than adjacent to the ring 19.

The ring 17 is provided for convenience of manipulation with two radially projecting handles 25, 26, which may be disposed apart by a distance about or a little more than ninety degrees.

Fast to the post or spindle 2 at an appropriate distance from the ball and socket joint at the lower end thereof, is a spider 27 having bosses 28 at the outer ends of the arms, this spider having four arms and conforming to the adjusting screw spider of the ordinary surveyor's transit. Each boss 28 is appropriately screw threaded for the reception of a leveling screw 29 having a manipulating head or nut 30 usually milled on the periphery to facilitate the grasping of the nut. The screw 29 is provided with a continuation 31 on the side of the nut 30 remote from the screw 29, and this continuation 31 is seated in a shoe 32 resting upon the ledge 12 or a segment 21 or 22, as the case may be. When the parts are assembled two diametrically opposite shoes rest at diametrically opposite points on the ledge 12 and the other two diametrically opposite shoes rest upon the segments 21 and 22 either at the respectively high and low points thereof or at some other corresponding points. The shoes are in sufficiently loose engagement with the continuations 31 to permit these shoes to rock with relation to the longitudinal axis of the respective screws 29, so that the shoes may conform to the inclinations of the ledge and segments 21 and 22.

If it be considered that the post or spindle 2 is perpendicular to the top face of the nut 8, which latter may for convenience be considered as the base plate of the head, and is parallel with the top of the tripod head, then the nuts or bosses 28 are equidistant from the top of the tripod. If such top be level the spindle 2 is upright and the instrument carried by this spindle is level.

If it were feasible to always set the tripod with its top level and with the spindle 2 accurately upright, there would be no necessity of special leveling means. Such an ideal condition, however, is wholly impracticable in the surveying and many other arts where accurate leveling must be attained very frequently and the instrument or instruments are being frequently changed as to location.

It is because of the conditions to be met that surveying and other instruments are provided with leveling screws, and where great accuracy is demanded such leveling screws are of very fine pitch. If other means than leveling screws be employed for obtaining the level position, the structure is such that the approach to the level position is slow or through greatly multiplied moving parts, for otherwise accurate leveling can be obtained only with great difficulty because of the liability of overrunning the level position.

While leveling screws of very small pitch are very efficient in surveying instruments and with other devices where accuracy is demanded, their manipulation is slow and time consuming.

Let it be assumed that the surveying instrument or other device which it is desired to level is equipped with the relatively rotatable inclined planes, one of which is represented by the ledge 12 and the other by the associated inclined segments 21 and 22, together with supporting members for the part to be leveled engaging the ledge and the inclined segment, these supporting members in the case of a surveying instrument, and under other conditions where extreme accuracy is demanded, being in the form of leveling screws or some equivalent leveling device or devices wherein a relatively limited and slowly attained progressive movement is accomplished by an extended movement in another direction.

Because of the two movements which are brought about by the associated and relatively rotatable inclined planes, whereby a quick approximation to the level position is attained, and the much more slowly acting means for the finer movement necessary to attain accurate leveling, the first arrangement may be termed a coarse adjustment and the more delicately-acting arrangement may be termed a fine adjustment. Furthermore, the two relatively rotatable members, either or both of which may be capable of actual rotation about a common axis, utilize coacting inclined surfaces, which in the main are plane surfaces, wherefore these parts are in effect wedges mounted and associated for progressive wedging action by movements of the wedges about an axis of rotation whereby the finer action may be a resultant of two forces perpendicular to each other and acting in planes also perpendicular to each other to cause rocking movements about correspondingly perpendicular axes located in the respective planes and intersecting at and there intersected by the axes of rotation of the rotatable wedges.

Since it is not at all feasible under the ordinary conditions present in surveying to set the tripod level, it is advisable with an instrument equipped with the present invention to tip the tripod noticeably out of level so that the instrumentman can ascertain at a glance which part of the tripod head is lowest. With the ordinary surveying instrument the leveling screws must be adjusted sometimes through considerable distances to bring the instrument into the level condition, and it not infrequently occurs that in the endeaver to so level the instrument one or more of the screws run out before the level position is attained, whereupon the tripod must be reset and the screws again manipulated at a very material expenditure of time, since the threads of the screws are of fine pitch, say twenty-eight to thirty-two per inch, and many turns of the screws are often needed to produce the desired material progressive movement of the screws.

With the leveling and adjusting attachment hereinbefore described the degree of inclination of the top of the tripod may be even greater than is feasible in the ordinary surveying instrument, yet the instrument may be brought to a level position almost instantly. Or, if it be questionable as to whether or not the instrument can be leveled at all with the particular set up of the tripod, such question can be determined at once by one or two quick movements by the operator. If it be found that with a turn of the upper ring of less than ninety degrees the instrument can be brought to an approximate level, then the accurate leveling can be completed by the customary leveling screws already on the instrument. If a quarter turn of the upper ring does not bring the instrument within quick leveling position by the fine adjustment, then it is the work of but a moment to reset the tripod and again bring the instrument into an approximate level. Furthermore the fine adjustment screws serve as clamps whereby the coarse adjustment rings become locked in the adjusted position and there is neither lost motion nor liability of the instrument accidentally shifting its position.

In order that the operation of the invention may be well understood, two examples will be taken as representative.

It will first be considered that when the instrument is set up the head of the tripod is at about the extreme inclination from which it is possible to accurately level the instrument, and it may be stated that the leveling from such an extreme condition is just as easily and just as quickly accomplished as though the tripod head were approximately level at the outset. It is actually easier to accurately and quickly level the instrument if the base plate and tripod head be inclined sufficiently so that the direction of tilt can be recognized at a glance, for such quick recognition of the direction of tilt is practically out of the question when the tripod head very closely approaches the level. Under the conditions assumed in which the inclination of the base plate is supposed to be within the extreme range of the device, either handle of the upper ring is grasped and such ring is turned in either direction until a leveling screw is over such handle, this meaning that the leveling screw is at the top or highest point of the inclined segment or wedge 21 or 22, as the case may be. Now, the turning is continued and at the same time the handle of the lower ring is grasped, so that both rings are turned together until the handles are in coincidence and come to rest at the lowest part of the base plate represented by the nut 8 engaging the tripod head. This position need be only approximate, since a moderate variation to either side of the actual lowest point is not material. If this operation does not bring the instrument into an approximately level condition the tripod should be reset, since the time so consumed is less than would be necessary to obtain the level condition with the leveling screws, as the latter need only be used for the finer delicate adjustment fully obtainable by a turn or two, or even a fractional turn of the leveling screws. If by good judgment the lower ring has thus been properly set, the bubble in the level over the two screws resting upon the lower ring and in direct engagement with the ledge 12 will be central or level. Since, however, the first operation need only be approximate it will usually be necessary to swing the entire device by means of the handle 16 attached to the lower ring, so that the whole instrument above and including the ring is rotated a small distance in the direction that the bubble should go and this movement is continued until the bubble is centered. When this is accomplished the two leveling screws resting upon the ledge 12 are clamped tight, care being taken to see that the bubble remains centered. The lower ring is thus tightly fastened so that the instrument will not revolve during the next operation. Now it is but necessary to rotate the upper ring until the bubble over the two screws bearing upon the segments 21 and 22 is centered and the two screws are then tightened without disturbing the centering of the bubbles and the whole instrument is level. This operation is all that is needful with a surveying level. With a transit the instrument must be centered over a point or station by means of the sliding center commonly used for such purpose, and hence the finer tightening of the screws to clamp the parts against movement is not done until such centering over the point or station is completed.

The station centering is rendered both easier and quicker with the present invention by the elimination of the tendency for the instrument to "crawl," which tendency is present where the four small shoes 32 of the leveling screws rest directly upon the inclined base plate, because in the latter case their position is being constantly disturbed by the twisting movement of the leveling screws. The large surface of the lower ring 10 resting undisturbed upon the inclined base plate represented by the top of the nut 8 eliminates all tendency to so crawl. Furthermore, the shoes rest on surfaces which eliminate all tendency of the screws to crawl along on either ring, since one of the shoes on each ring must ascend an incline exactly equal to that which its mate descends in such a movement. Furthermore, the pitch of inclination of the inclined planes on which the shoes rest decreases as the inclination of the base plate increases, while the reverse of such condition is present in prior devices for leveling.

It may sometimes occur that at some previous set up the leveling screws had been run out so that those on one side are longer than those on the other, whereupon the first bubble will not center when the handle of the lower ring rests over the lowest place on the base plate. In such case the handle must be moved around in the direction that it is desired the bubble should go. The wedge effect of the lower ring then corrects the unevenness of the screws.

The operation is most rapid when the leveling screws are kept reasonably near the same length with respect to the spider carrying them, although the instrument can be quickly leveled regardless of the uneven condition of the screws.

Considering now the second example where the base plate is level, or nearly so. The screws are loosened as before and the instrument is grasped with one hand, while the lower ring is turned until the bubble centers, after which the screws resting on the lower ring are tightened. Then the upper ring is moved until the other bubble centers, and the adjustments are completed as before. When the instrument is so nearly level that the low point cannot be ascertained at a glance, it is unnecessary to first set the handles so as to bring them at the low point of the base plate.

In the use of the invention the first thing to do is to center the bubble in the level located over the screws which rest on the lower ring, after which the lower ring is clamped by the screws so that it will not shift its position during the next operation. Then the bubble in the other level over the second pair of screws is centered and the screws are clamped tight. Such leveling may be accomplished in a very short time which might be determined by seconds, where the ordinary leveling would take minutes. The rotatable wedges or inclined surfaces provide a coarse leveling adjustment of extreme rapidity of operation, whereby a close approximation to true leveling is obtained. The attainment of the most accurate leveling is by means of the fine adjustment, but this requires usually but a fractional turn of the leveling screws, and may be brought about during the operation of clamping the rings in place.

The setting up and leveling of the instrument may be so rapidly performed that the same degree of accuracy is obtainable in about one-tenth of the time usually required in setting up surveying instruments under the present universal method of leveling such instruments. When it is considered that the surveying instrument is changed many times in the course of a day's work and oftentimes the entire surveying party has to wait upon the instrumentman, the saving in time is very marked and the instrumentman is relieved from the tediousness due to the slow procedure usually necessary in the operation of setting up.

The invention has been described with respect to one of its applications, namely, its application to surveying instruments for the quick and accurate leveling thereof, but it is to be understood that the invention is not of necessity limited in its application to surveying instruments alone, but may be employed wherever quick and accurate leveling is demanded.

If the application be to instruments or devices of great weight, then, of course, suitable provision is made for reducing or overcoming friction in any of the customary ways. If the instruments or devices be of a relatively light nature and quick or frequent leveling or adjusting is desired, anti-friction devices are not needed.

With the present invention the rotatable inclined or wedge members while applicable under some circumstances for leveling may be considered on account of their quick or coarse action as adjusting devices for bringing the instrument or device or apparatus into an approximation of true leveling, while the finer accurate leveling is accomplished by a much finer and slower acting adjustment. The fine adjustment, however, need have but an extremely small range of movement because the greater range of movement is taken care of by the quick adjuster.

No particular directions can be given as to size, or material, or as to the degree of inclination of the wedge surfaces, or the relative degrees of the surface of the two elements to each other, since these characteristics may vary quite markedly in different applications of the invention. For one purpose, say, such as that illustrated in the drawings, it is advisable to have both rings rotatable with respect to the supporting means and to provide clamping screws which at the same time serve as fine adjustment leveling screws. For another purpose either or both rings may rotate and the clamping means need not of necessity constitute fine adjustment leveling means although for other purposes the fine adjustment leveling feature may be retained. For some purposes steel may answer better than some other metal, while for other purposes it may be advisable to employ a non-magnetic material.

For extremely heavy work it may be necessary to provide some additional means for rotating the rings. For small work this may be done by hand, as in the example given in the drawings. Furthermore, the manner of supporting the rings is susceptible of wide variations. Instead of the rings rotating about a central post or standard and the latter being mounted on a ball and socket joint, other supporting means may be employed.

For all these reasons the particular embodiment of the invention shown in the drawings is more or less indicative of a somewhat extended variety of embodiments which, however, in whole or in part utilize the salient features of the invention.

As an example of another embodiment of the invention reference is made to the disclosure of another application for Letters Patent filed by me on even date herewith for a Time Saving Leveler and Adjuster. Those claims in the present application which read on the disclosure of the said other application are to be interpreted in view of both disclosures.

It is to be understood that the broader features of the invention found in both applications are claimed herein, while the claims in said other application are restricted to features not disclosed herein.

The upper ring, shown separately in Figs. 4 and 6, is useful without the lower ring shown separately in Fig. 5, since the upper ring alone provides a quick adjustment, for leveling, possessing material advatanges over the method now in common use. In such case a flat plate or ring replaces the lower ring shown in Fig. 5 and the four fine-thread leveling screws are retained.

What is claimed is:—

1. An adjusting means for introduction between a support and an object to be sustained thereby, comprising two members capable of relative rotation, with one having an inclined or wedge-shaped sustaining surface on which the other is mounted and the second member having an inclined or wedge-shaped surface remote from the first member for engagement with the object to be sustained.

2. An adjusting means for introduction between a support and an object to be sustained thereby, comprising two rotatable members one adapted to the support and having an inclined or wedge-shaped surface remote from the support and the second member being mounted on the inclined surface of the first-named member for rotation about an axis perpendicular to the inclined surface, and said second-named member having a surface remote from the first-named member of inclined or wedge shape and adapted to be engaged by the object to be sustained.

3. An adjusting means for introduction between a support and an object to be sustained thereby, comprising two rotatable members of which one is provided with an inclined or wedge-shaped surface constituting a support for the second member and upon which inclined surface the second member is rotatable about an axis perpendicular to said inclined surface, and said second-named member having a surface remote from the first-named member inclined with relation to the axis of rotation of the second-named member and adapted to uphold the object to be sustained.

4. An adjusting means for introduction between a support and an object to be sustained thereby, comprising two members one rotatable on the other, with the first member having an inclined or wedge face supporting the other member, and the second member having an inclined or wedge portion remote from the first member, and means for upholding the article to be sustained engaging the inclined surfaces of both members.

5. An adjusting means for introduction between a support and an object to be sustained thereby, comprising two members one rotatable on the other with one member having a supporting surface for the other of inclined or wedge shape and the second member being rotatable on the inclined supporting surface about an axis perpendicular to said surface and in turn having an inclined or wedge shaped supporting surface remote from the first member, and sustaining means for the object to be supported simultaneously engaging the inclined surfaces of both members.

6. An adjusting means for introduction between a support and an object to be sustained thereby, comprising a member with an inclined or wedge surface and another member rotatable on the inclined surface of the first member and in turn provided with an inclined or wedge surface remote from that of the first-named member, said second member having its inclined surface of less extent than the first member to expose a fractional portion of the wedge surface of the first member.

7. An adjusting means for introduction between a support and an object to be sustained thereby, comprising a rotatable member having an inclined or wedge-shaped face, another rotatable member mounted for rotation upon the inclined surface of the first member about an axis perpendicular to such inclined surface and in turn having wedge or inclined surfaces on diametrically opposite sides of the axis of rotation exposing diametrically opposite portions of the first-named inclined surface, and diametrically opposite supporting means for the object to be sustained engaging respectively opposite inclined portions of both members.

8. An adjusting member for introduction between a support and an object to be sustained thereby, comprising a rotatable member having an inclined surface with a circularly arranged supporting portion, another member carried by the circularly arranged supporting portion of the inclined surface of the first-named member and rotatable about an axis perpendicular to said inclined surface, said second member having spaced circularly arranged inclined surfaces remote from the first-named inclined surface, and upholding means for the object to be sustained simultaneously engaging the inclined surfaces of both rotatable members.

9. An adjusting means for introduction between a support and an object to be sustained thereby, comprising two rotatable members one having an inclined or wedge-shaped surface supporting the other member and on which the latter is rotatable about an axis perpendicular to the plane of inclination, and said second member having segments of an inclined surface on the face remote from the first-named member, and means for upholding the object to be sustained simultaneously engaging the inclined surfaces of both rotatable members.

10. An adjusting means for introduction between a support and an object to be sustained thereby, comprising a rotatable member adapted to the support and having a circularly arranged surface inclined with relation to the axis of rotation of the member, another rotatable member mounted upon the inclined surface of the first-named member and provided with circumferentially spaced circularly arranged and diametrically oppositely located segments on a surface inclined with relation to the axis of rotation of said second-named member, oppositely-disposed upholding means for the object to be sustained respectively engaging the first-named inclined surface between the ends of the inclined segments, and other upholding means for the object to be sustained respectively engaging the diametrically opposite segments of the inclined surface of the second-named member.

11. An adjusting means for introduction between a support and an object to be sustained thereby, comprising a rotatable member adapted to the support and having a circularly arranged surface inclined with relation to the axis of rotation of the member, another rotatable member mounted upon the inclined surface of the first-named member and provided with circumferentially spaced circularly arranged and diametrically opposite located segments on a surface inclined with relation to the axis of rotation of said second-named member, oppositely disposed upholding means for the object to be sustained respectively engaging the first-named inclined surface between the ends of the inclined segments, and other upholding means for the object to be sustained respectively engaging the diametrically opposite segments of the inclined surface of the second-named member, the engaging surfaces of the inclined segments and the engaging portions of the first-named inclined surface between the segments being substantially in quadrature.

12. An adjusting means for introduction between a support and an object to be sustained thereby, comprising a rotatable member having one surface adapted to the support and the opposite surface of inclined or wedge shape and extending on opposite sides of the axis of rotation, and another rotatable member mounted on the inclined surface of the first-named member and rotatable thereon about an axis intersecting the axis of rotation of the first-named member at an angle corresponding to the degree of inclination of the inclined surface of the first-named member, and said second-named member having inclined or wedge shape portions on opposite sides of the axis of rotation and constituting segments of one inclined surface.

13. An adjusting means for introduction between a support and an object to be sustained thereby, comprising a rotatable member having one surface adapted to the support and the opposite surface of inclined or wedge shape and extending on opposite sides of the axis of rotation, and another rotatable member mounted on the inclined surface of the first-named member and rotatable thereon about an axis intersecting the axis of rotation of the first-named member at an angle corresponding to the degree of inclination of the inclined surface of the first-named member, and said second-named member having inclined or wedge shape portions on opposite sides of the axis of rotation and constituting segments of one inclined surface, said segments being spaced apart at the opposite ends and thereby exposing corresponding sections of the first-named inclined surface.

14. An adjusting means for introduction between a support and an object to be sustained thereby, comprising a rotatable member having one surface adapted to the support and the opposite surface of inclined or wedge shape and extending on opposite sides of the axis of rotation, and another rotatable member mounted on the inclined surface of the first-named member and rotatable thereon about an axis intersecting the axis of rotation of the first-named member at an angle corresponding to the degree of inclination of the inclined surface of the first-named member, and said second-named member having inclined or wedge shape portions on opposite sides of the axis of rotation and constituting segments of one inclined surface, said segments being spaced apart at the opposite ends and thereby exposing corresponding sections of the first-named inclined surface, and adjacent ends of the segments terminating in abrupt shoulders upstanding from the first-named inclined surface with the other adjacent ends closely approaching the first-named inclined surface.

15. An adjusting and leveling means for introduction between a support and an object to be leveled, comprising a rotatable member adapted to the support and having the surface remote therefrom inclined or wedge shaped and extending to opposite sides of the axis of rotation, another rotatable member mounted on the inclined surface of the first-named member and rotatable thereon about an axis inclined to the axis of rotation of the first-named member to a degree corresponding to the inclination of the inclined surface, and said second-named member having segments of an inclined surface on opposite sides of its axis of rotation and spaced apart circumferentially to expose corresponding portions of the first-named inclined surface, and adjusting screws adapted to be carried by the object to be leveled and engaging the inclined surfaces of both members on respectively opposite sides of the axes of rotation of said members.

16. An adjusting and leveling means for introduction between a support and an object to be leveled, comprising a rotatable member adapted to the support and having the surface remote therefrom inclined or wedge shaped and extending to opposite sides of the axis of rotation, another rotatable member mounted on the inclined surface of the first-named member and rotatable thereon about an axis inclined to the axis of rotation of the first-named member to a degree corresponding to the inclination of the inclined surface, and said second-named member having segments of an inclined surface on opposite sides of its axis of rotation and spaced apart circumferentially to expose corresponding portions of the first-named inclined surface, and adjusting screws adapted to be carried by the object to be leveled and engaging the inclined surfaces of both members on respectively opposite sides of the axes of rotation of said members, the rotatable members having a range of rotation limited by the spacing of the inclined segments and the adjusting screws having the threads of relatively fine pitch.

17. An adjusting and leveling means for introduction between a support and an object to be sustained thereby, comprising coacting rotatable wedge members and adjusting screws engaging the wedge members and in turn engaging the object to be sustained.

18. An adjusting and leveling means for introduction between a support and an object to be leveled, comprising coacting rotatable wedge members with the wedge portion of one member engaging and supporting the other member and with the wedge portions of both members directed toward the object to be leveled, said wedge members constituting a coarse or rapid adjustment for the object to be leveled, and fine or slow acting adjusting means for the object to be leveled interposed between said object and the wedge portions of the coarse or rapidly acting adjusting means.

19. A leveling means for introduction between a support and an object to be leveled, comprising two separately rotatable coacting members each provided with wedge surfaces and with the wedge surface of one member constituting a sustaining bearing for the other member and with the wedge surface of both members directed and exposed toward the object to be leveled, said coacting wedge members constituting a coarse or rapid acting leveling means, and a fine or slow acting leveling means associated with the coarse adjusting means in engagement with the wedge surfaces of both rotatable members and sustaining the object to be leveled.

20. A leveling means for introduction between a support and an object to be leveled, comprising two separately rotatable coacting members each provided with wedge surfaces and with the wedge surface of one member constituting a sustaining bearing for the other member and with the wedge surfaces of both members directed and exposed toward the object to be leveled, said coacting wedge members constituting a coarse or rapidly acting leveling means, and a fine or slow acting leveling means associated with the coarse adjusting means in engagement with the wedge surfaces of both rotatable members and sustaining the object to be leveled, said fine adjusting means comprising adjusting screws of fine pitch.

21. A leveling means for introduction between a support and an object to be leveled, comprising two separately rotatable coacting members each provided with wedge surfaces and with the wedge surface of one member constituting a sustaining bearing for the other member and with the wedge surfaces of both members directed and exposed toward the object to be leveled, said coacting wedge members constituting a coarse or rapidly acting leveling means, and a fine or slow acting leveling means associated with the coarse adjusting means in engagement with the wedge surfaces of both rotatable members and sustaining the object to be leveled, said fine adjusting means comprising adjusting screws of fine pitch, and said screws having shoes interposed between the wedge surfaces and the corresponding ends of the screws.

22. A surveying instrument provided with a leveling means comprising two associated rotatable rings one with an inclined or wedge shaped face upon which the other ring is mounted for rotation about an axis inclined in conformity with the inclination of the wedge face, and the second ring being provided with diametrically opposite segments of a wedge surface on the face of the ring remote from the first ring, and adjusting screws in pairs with the screws of one pair engaging the first-named wedge surface on opposite sides of its axis of rotation and the second pair of screws respectively engaging the wedge segments.

23. A surveying instrument provided with a leveling means comprising two associated rotatable rings one with an inclined or wedge shaped face upon which the other ring is mounted for rotation about an axis inclined in conformity with the inclination of the wedge face, and the second ring being provided with diametrically opposite segments of a wedge surface on the face of the ring remote from the first ring, and adjusting screws in pairs with the screws of one pair engaging the first-named wedge surface on opposite sides of its axis of rotation and the second pair of screws respectively engaging the wedge segments, the first-named ring being provided with a manipulating handle located at the thick portion of the inclined or wedge surface and the second-named ring having spaced handles located respectively at the thick portions of the wedge segments.

24. A surveying instrument provided with an adjusting and leveling means comprising a ring mounted on the head of the instrument for lateral adjustment and also rotatable on said head, the ring having the surface remote from the head of inclined or wedge shape extending to opposite sides of the axis of rotation, another ring mounted on the inclined or wedge surface for rotation thereon and provided with segments of a wedge or inclined surface on the face of the ring remote from the first-named ring, said rings being each provided with manipulating means, and adjusting screws on the surveying instrument in operative relation to the wedge or inclined surfaces for effecting a fine adjustment of the leveling and for clamping the rings against rotation.

25. A surveying instrument provided with an adjusting and leveling means comprising a ring mounted on the head of the instrument for lateral adjustment and also rotatable on said head, the ring having the surface remote from the head of inclined or wedge shape extending to opposite sides of the axis of rotation, another ring mounted on the inclined or wedge surface for rotation thereon and provided with segments of a wedge or inclined surface on the face of the ring remote from the first-named ring, said rings being each provided with manipulating means, and adjusting screws on the surveying instrument in operative relation to the wedge or inclined surfaces for effecting a fine adjustment of the leveling and for clamping the rings against rotation, the screws being provided with shoes in rockable relation to the screws and interposed between the screws and the wedge surfaces to conform to varying inclinations of said wedge surfaces with relation to the screws.

26. An adjusting means for introduction between a support and an object to be sustained thereby, comprising two associated adjusting devices each having means for changing the direction of movement caused by an applied force into a movement in another direction, one device being carried by and movable with the other and also movable independently of the device carrying it, and each device having its degree of secondary movements differing from that of the other device under the same extent of primary movement caused by the applied force.

27. An adjustment means for introduction between a support and an object to be sustained thereby, comprising two associated adjusting devices each capable of rotary movement independent of the rotary movements of the other, one device comprising leveling screws carried by and movable linearly by the other device and imparting to the sustained object a reach of linear movement due to the rotation of the leveling screws differing from the rate of linear movement imparted to it by said other device.

28. An adjusting and leveling means for introduction between a support and an object to be sustained thereby, comprising co-acting members one of which is rotatable about an axis and consists of segments of a wedge disposed on opposite sides of the axis of rotation and spaced apart at both the thick and thin edges of the wedge to expose the other member, and adjusting screws engaging both the wedge segments and the portion of the other member between the ends of the segments and also engaging the object to be sustained.

29. An adjusting and leveling means for introduction between a support and an object to be sustained thereby, including a rotatable member having segments of a wedge disposed on opposite sides of the axis of rotation and spaced apart at both the thick and thin ends of the wedge.

30. An adjusting and leveling means for introduction between a support and an object to be sustained thereby, comprising a rotatable member provided with diametrically oppositely disposed segments of a wedge with each segment including substantially a quadrant and spaced apart at the thick ends and also at the thin ends of the segments by substantially a quadrant, and four equi-distantly disposed adjusting screws engaging the object to be sustained with two of the diametrically opposite screws engaging the wedge segments and the other two screws located in the space between corresponding ends of the wedge segments.

In testimony, that I claim the foregoing as my own, I have hereto affixed my signature in the presence of two witnesses.

JASON SAMUEL FRYE.

Witnesses:
ELIPHALET LEWIS CASE,
MARK NORMAN ALLING.

Copies of this patent may be obtained for five cents each, by addressing the "Commissioner of Patents, Washington, D. C."